US008253715B2

(12) United States Patent
Choi et al.

(10) Patent No.: US 8,253,715 B2
(45) Date of Patent: Aug. 28, 2012

(54) SOURCE DRIVER AND LIQUID CRYSTAL DISPLAY DEVICE HAVING THE SAME

(75) Inventors: Woo-Jae Choi, Seoul (KR); Jong-Kee Kim, Suwon-si (KR); Kyoo-Joon Lee, Seoul (KR)

(73) Assignee: Dongbu HiTek Co., Ltd., Seoul (KR)

( * ) Notice: Subject to any disclaimer, the term of this patent is extended or adjusted under 35 U.S.C. 154(b) by 351 days.

(21) Appl. No.: 12/608,804

(22) Filed: Oct. 29, 2009

(65) Prior Publication Data

US 2010/0110064 A1 May 6, 2010

(30) Foreign Application Priority Data

Nov. 5, 2008 (KR) ........................ 10-2008-0109505

(51) Int. Cl.
*G06F 3/038* (2006.01)

(52) U.S. Cl. ........................................ 345/204; 345/100

(58) Field of Classification Search .................... 345/87, 345/98, 100

See application file for complete search history.

(56) References Cited

U.S. PATENT DOCUMENTS

| | | | | |
|---|---|---|---|---|
| 7,154,495 | B1 * | 12/2006 | Bucklen | 345/213 |
| 2005/0073516 | A1 * | 4/2005 | Kang | 345/204 |
| 2006/0119592 | A1 * | 6/2006 | Wang et al. | 345/204 |
| 2007/0146355 | A1 * | 6/2007 | Bae | 345/204 |
| 2007/0164883 | A1 * | 7/2007 | Furtner | 341/126 |
| 2008/0122829 | A1 * | 5/2008 | Park | 345/213 |
| 2008/0246755 | A1 * | 10/2008 | Lee | 345/214 |

* cited by examiner

*Primary Examiner* — Chanh Nguyen
*Assistant Examiner* — Roy Rabindranath
(74) *Attorney, Agent, or Firm* — Sherr & Vaughn, PLLC

(57) ABSTRACT

A source driver and a liquid crystal display (LCD) device having the same. A source driver may carry a clock in a data current, and may recover a clock signal and/or a data signal without being substantially affected by external frequencies and/or resistance. A source driver may include a trans-impedance amplifier which may receive data currents, convert data currents into voltages, and/or output voltages as data voltages and/or clock voltages. A source driver may include a comparator electrically coupled to a trans-impedance amplifier, which may change levels of data and/or clock voltages applied from a trans-impedance amplifier, and/or may output level-changed voltages as data signals and/or a clock signal.

9 Claims, 4 Drawing Sheets

SOURCE DRIVER AND LIQUID CRYSTAL DISPLAY DEVICE HAVING THE SAME

Figure 1:
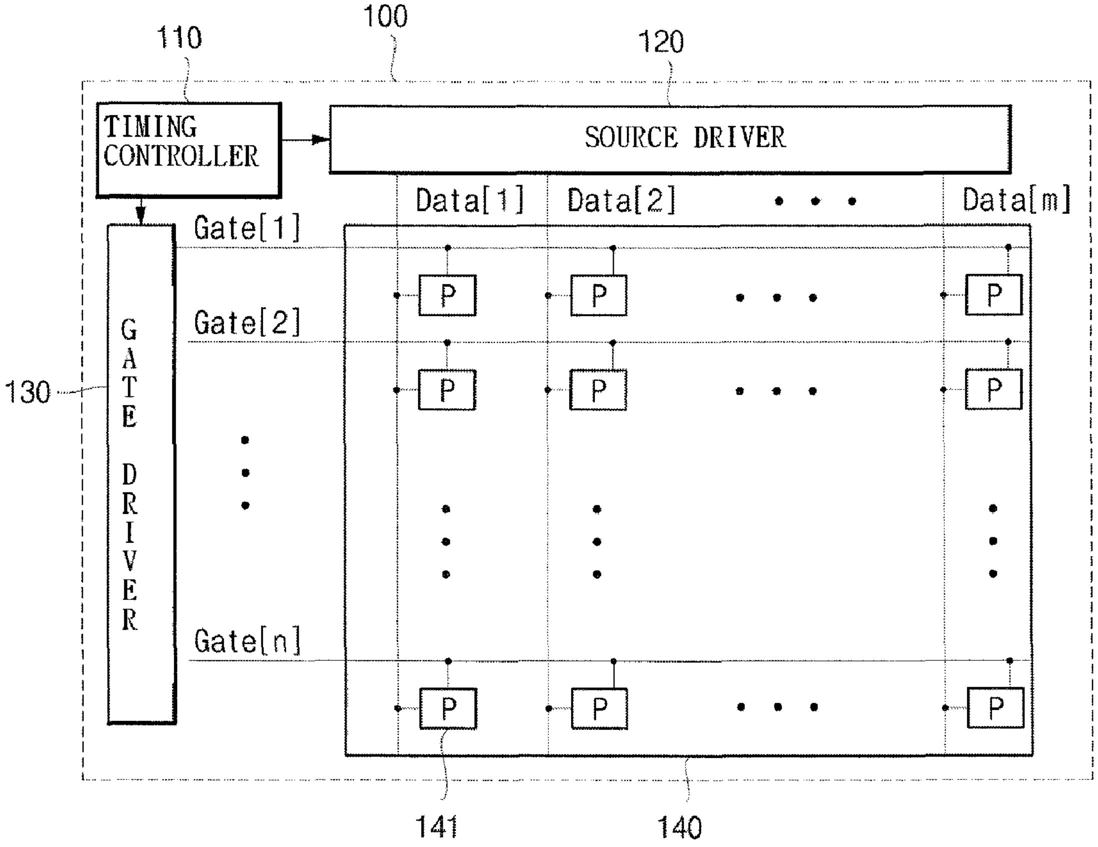

The present application claims priority under 35 U.S.C. 119 to Korean Patent Application No. 10-2008-0109505 (filed on Nov. 5, 2008) which is hereby incorporated by reference in its entirety.

BACKGROUND

Embodiments relate to a source driver and a liquid crystal display (LCD) device having the same.

An interface between a timing controller and a source driver in an LCD device may use a reduced swing differential signaling (RSDS) system and/or a mini-low voltage differential signaling (mini-LVDS) system. A termination resistor may be used to convert a data current into a corresponding voltage, and thus to recover a desired signal, in either a RSDS system or a mini-LVDS system. A variation in resistance of a termination resistor may occur in an LCD device, which may include a panel exhibiting a relatively high resolution while having a relatively large area. Due to a resistance variation of a termination resistor, electromagnetic waves may be generated during voltage recovery and/or signal transmission operations since a multi-drop mode may be used in a RSDS system or a mini-LVDS system. Therefore, errors may occur in voltage recovery and/or signal transmission operations.

It may be relatively difficult to secure a desired signal transmission quality since a source driver transmits a signal to substantially all signal lines in a multi-drop mode used in a RSDS or a mini-LVDS system. An advanced intra panel interface (AiPi) may be used to address the above-mentioned problems incurred in a RSDS or a mini-LVDS system. An AiPi is not driven in a multi-drop mode, but may be driven in a point-to-point mode. A clock signal may be transmitted to a source driver while being carried in a data signal, in order to substantially eliminate skew among signal lines, in an AiPi.

In a system using an AiPi, each data line may be swung among multiple levels between a relatively high reference voltage and a relatively low reference voltage. An AiPi may recognize a signal on a data line, as a clock signal, when a voltage level of a signal is higher than a relatively high reference voltage and/or lower than a relatively low reference voltage. When a voltage level of a signal on a data line is between a relatively high reference voltage and a relatively low reference voltage, an AiPi may sort a signal as a data signal.

A high relatively reference voltage and/or a relatively low reference voltage, which may be used in an AiPi to distinguish a clock and/or data from each other, for signal recovery, may be generated in a source driver. A termination resistor may be used to convert an input data current into a corresponding data voltage. Therefore an increase in resistance may occur in each signal line, and/or IR-drop may occur. Errors may be generated in a signal recovery operation.

A chip-on-glass (COG) structure may be used in an LCD panel, for example in miniature appliances, in place of a connection structure using a chip-on film (COF) and/or a tape carrier package (TCP), to achieve an enhancement in price competitiveness. A flexible printed circuit (FPC) may be used in a COG structure to connect power and/or control signals between a control board and a driver. A COG structure may achieve an enhancement in price competitiveness since, for example, the area of a FPC may be reduced as a chip may be formed on and/or over a glass. Also, power and/or signal lines may be formed on and/or over glass. However, signal lines formed on and/or over glass may exhibit a relatively increased resistance compared to a printed circuit board (PCB). Therefore, there may be a difficulty in driving a LCD panel using a COG structure in interface systems such as RSDS, mini-LVDS, and/or AiPi systems.

Accordingly, there is a need for a source driver capable of carrying a clock in a data current. There is a need for a source driver capable of recovering a clock signal and/or a data signal without being substantially affected by external frequencies and/or resistance. There is a need for devices, such as an LCD device, having the same.

SUMMARY

Embodiments relate to a source driver and a liquid crystal display device having the same. According to embodiments, a source driver may be capable of carrying a clock in a data current. In embodiments, a source driver may recover a clock signal and/or a data signal, using current levels, without being substantially affected by a termination resistance and/or external frequencies. In embodiments, errors generated during a signal recovery operation may be minimized. In embodiments, a liquid crystal display device including a source driver may be provided.

According to embodiments, a source driver may be capable of transmitting a data current and a clock under a condition in which a clock is carried in a data current. In embodiments, a source driver may recover a data signal and/or a clock signal through a trans-impedance amplifier. In embodiments, IR-drop may be minimized. In embodiments, errors occurring during a signal recovery operation may be minimized. In embodiments, signal recovery, using a relatively small current, may be achieved. In embodiments, a liquid crystal display device including a source driver may be provided.

According to embodiments, a source driver may include a trans-impedance amplifier which may receive data currents, convert data currents into voltages, and/or output voltages as data voltages and/or clock voltages. In embodiments, a source driver may include a comparator which may be electrically coupled to a trans-impedance amplifier. In embodiments, a comparator may change levels of data and/or clock voltages applied from a trans-impedance amplifier. In embodiments, a comparator may output level-changed voltages as data signals and/or a clock signal.

According to embodiments, a trans-impedance amplifier may include a first data amplifier which may receive a first data current and/or convert a first data current into a voltage, thereby outputting a first data voltage. In embodiments, a trans-impedance amplifier may include a second data amplifier which may receive a second data current and/or convert a second data current into a voltage, thereby outputting a second data voltage. In embodiments, a trans-impedance amplifier may include a clock amplifier which may receive a first and/or a second data current, and/or convert a first and/or a second data current into a voltage, thereby outputting a clock voltage.

According to embodiments, a comparator may include a first data comparator which may change a level of a first data voltage applied from a first data amplifier, thereby outputting a first data signal. In embodiments, a comparator may include a second data comparator which may change a level of a second data voltage applied from a second data amplifier, to output a second data signal. In embodiments, a comparator may include a clock amplifier which may change a level of a clock voltage applied from a clock amplifier, thereby outputting a clock signal.

According to embodiments, each of a first and a second data current applied to a trans-impedance amplifier may have respective first and second current levels which may enable first and second data voltages to be output. In embodiments, first and second data currents may have third and fourth current levels which may enable a clock voltage to be output.

In embodiments, a second current level may be higher than a first current level. In embodiments, a third current level may be higher than a second current level. In embodiments, a fourth current level may be lower than a first current level.

According to embodiments, a source driver may include third to m-th data amplifiers which may receive third to m-th data currents. In embodiments, third to m-th data amplifiers may convert third to m-th data currents into voltages, thereby outputting third to m-th data voltages. In embodiments, third to m-th data comparators may change levels of third to m-th data voltages applied from third to m-th data amplifiers, thereby outputting third to m-th data signals. In embodiments, each of third to m-th data currents may have a fourth current level and a first current level.

According to embodiments, a source driver may include a delay locked loop which may be electrically coupled to a comparator. In embodiments, a delay locked loop may generate a clock having a plurality of pulses when a clock signal is applied.

Embodiments relate to a liquid crystal display device which may include a source driver. In embodiments, a liquid crystal display device may include a timing controller which may be electrically coupled to a source driver, which may transmit data currents to a source driver. In embodiments, a liquid crystal display device may include a gate driver which may output gate signals. In embodiments, a liquid crystal display device may include a liquid crystal display panel which may be electrically coupled to a gate driver and/or a source driver, which may receive gate signals, data signals and/or a clock signal, and which may determine an alignment of liquid crystals in accordance with received signals, thereby displaying an image.

DRAWINGS

Example FIG. 1 illustrates a block diagram of a liquid crystal display (LCD) device in accordance with embodiments.

Figure 2A:
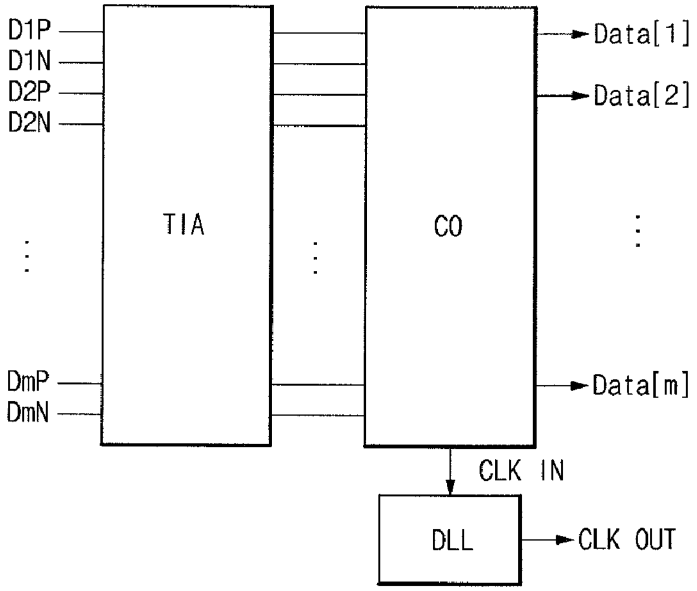
Figure 2B:
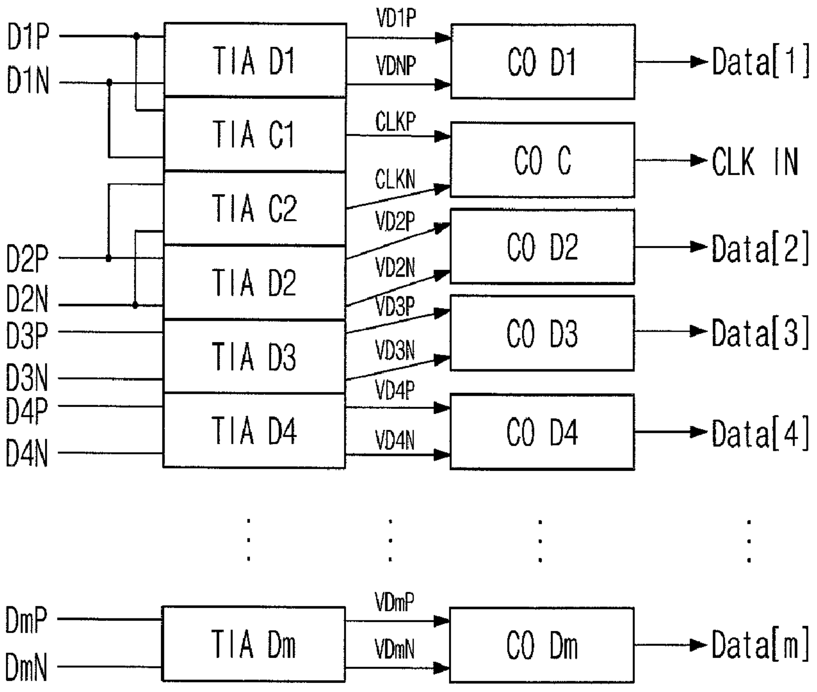

Example FIG. 2A to FIG. 2B illustrates block diagrams of a source driver in accordance with embodiments.

Figure 3A:
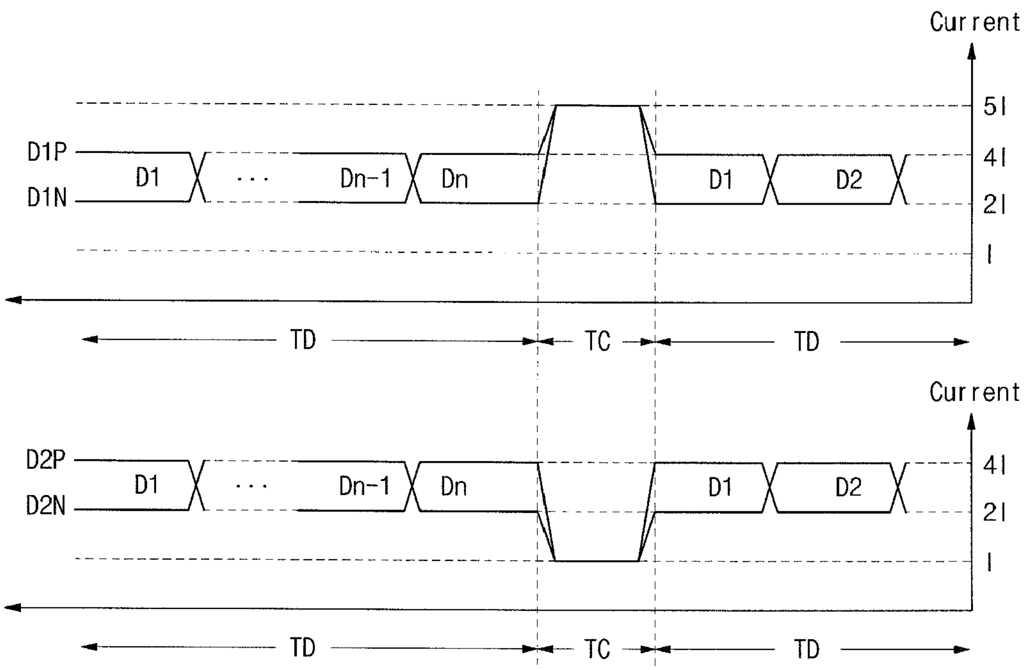
Figure 3B:
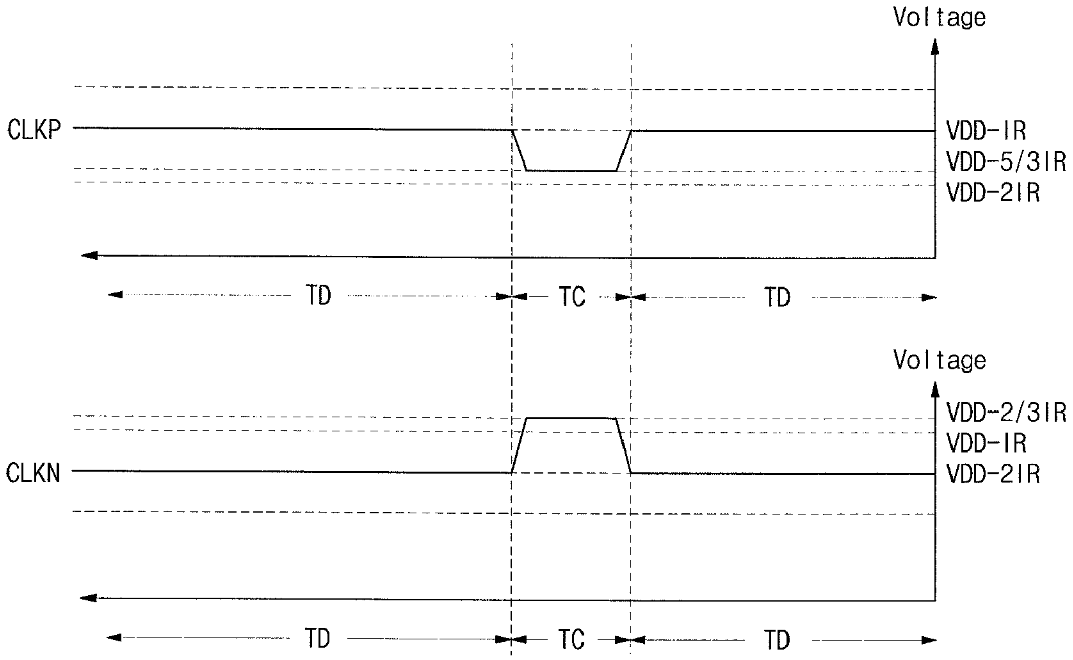
Figure 3C:
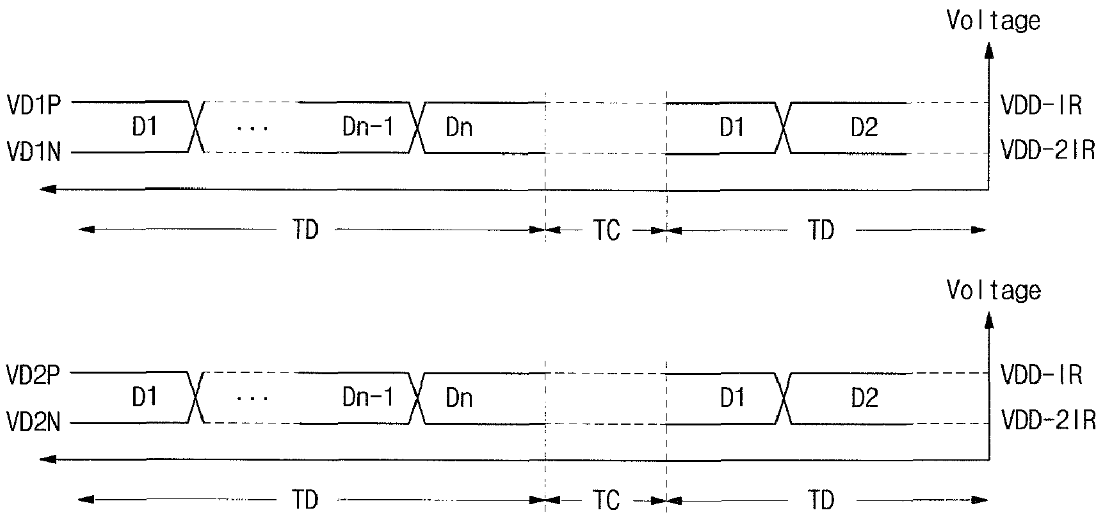

Example FIG. 3A to FIG. 3C illustrates diagrams of driving timing of a source driver in accordance with embodiments.

DESCRIPTION

Embodiments relate to a liquid crystal display (LCD) device. Referring to example FIG. 1, a liquid crystal display (LCD) device is illustrated in accordance with embodiments. According to embodiments, LCD device 100 may include timing controller 110, source driver 120, gate driver 130 and/or LCD panel 140. In embodiments, data lines and/or data signals applied to data lines may be designated by substantially the same reference numerals, for example, Data[1], Data[2], . . . Data[m].

According to embodiments, timing controller 110 may be electrically coupled to source driver 120 and/or gate driver 130. In embodiments, timing controller 110 may generate a plurality of control signals to control constituent elements of LCD device 100, such as source driver 120 and/or gate driver 130. In embodiments, timing controller 110 may apply a data current to source driver 120.

According to embodiments, source driver 120 may sequentially supply a data signal to LCD panel 140 using a plurality of data lines Data[1], Data[2], . . . and/or Data[m]. In embodiments, source driver 120 may receive data current, recover a clock signal and/or a data signal from a received data current, and/or output recovered signals. In embodiments, source driver 120 may carry, in data current, a current component having a level different from data current, which may include a clock signal. In embodiments, source driver 120 may receive a resultant data current and may recover a data signal, and/or a clock signal, in the form of voltages from a received data current in accordance with a conversion operation.

According to embodiments, source driver 120 may substantially eliminate a signal line for a separate clock signal. In embodiments, source driver 120 may achieve relatively easy signal recovery since it may be possible to recover a data signal and/or a clock signal in accordance with corresponding voltage levels, for example substantially without using separate reference voltages.

According to embodiments, gate driver 130 may sequentially supply a gate signal to LCD panel 140 via a plurality of gate lines Gate[1], Gate[2], . . . and/or Gate[n]. In embodiments, LCD panel 140 may include a plurality of gate lines Gate[1], Gate[2], . . . and/or Gate[n] arranged in a horizontal direction, a plurality of data lines Data[1], Data[2], . . . and/or Data[m] arranged in a vertical direction, and/or pixel circuits 141 which may be defined by a plurality of gate lines Gate[1], Gate[2], . . . and/or Gate[n] and a plurality of data lines Data[1], Data[2], . . . and/or Data[m]. In embodiments, each pixel circuit 141 may be formed at a pixel region defined by two neighboring gate lines and two neighboring data lines. In embodiments, a gate signal from gate driver 130 may be supplied to gate lines Gate[1], Gate[2], . . . and/or Gate[n], and/or a data signal from data driver 120 may be supplied to data lines Data[1], Data[2], . . . and/or Data[m].

According to embodiments, LCD device 100 may include elements arranged between source driver 120 and LCD panel 140. In embodiments, elements may include a latch to sustain a data signal, a digital/analog (D/A converter) to convert a data signal received from source driver 120 into an analog signal, and/or a buffer to control an application rate of a data signal. In embodiments, elements are not limited thereto.

Embodiments relate to a source driver. Referring to example FIG. 2A to FIG. 2B, block diagrams illustrate a source driver in accordance with embodiments. According to embodiments, source driver 120 may include a trans-impedance amplifier (TIA) and/or a comparator (CO). In embodiments, source driver 120 may include a delay locked loop (DLL).

According to embodiments, a trans-impedance amplifier (TIA) may be electrically coupled to timing controller 110 and/or a comparator (CO). In embodiments, a trans-impedance amplifier (TIA) may convert data currents D1P, D1N, D2P, D2N, . . . , DmP and/or DmN into respective corresponding voltages. In embodiments, a trans-impedance amplifier (TIA) may output voltages as data voltages VD1P, VD1N, VD2P, VD2N, . . . VDmP and/or VDmN. In embodiments, a trans-impedance amplifier (TIA) may output voltages as clock voltages CLKP, CLKN, etc. In embodiments, voltages may be transmitted to a comparator (CO). In embodiments, data currents D1P, D1N, D2P, D2N, . . . DmP and/or DmN may be recovered into corresponding data signals, which may be applied to LCD panel 140 via respective data lines Data[1], Data[2], . . . and/or Data[m].

According to embodiments, a trans-impedance amplifier (TIA) may include first to m-th data amplifiers TIA D1 to TIA Dm, a first clock amplifier TIA C1, and/or a second clock amplifier TIA C2. In embodiments, first to m-th data amplifiers TIA D1 to TIA Dm, first clock amplifier TIA C1, and/or second clock amplifier TIA C2 may have internal resistances. In embodiments, in accordance with respective internal resistances and/or current levels of data currents D1P, D1N, D2P, D2N, . . . , DmP and/or DmN, respective voltage levels of output data voltages VD1P, VD1N, VD2P, VD2N, . . . , VDmP and/or VDmN, and/or clock voltages CLKP and CLKN, may be determined.

According to embodiments, first to m-th data amplifiers TIA D1 to TIA Dm may receive data currents from timing controller 110 and may convert data currents D1P, D1N, D2P, D2N, . . . , DmP and/or DmN into respective data voltages VD1P, VD1N, VD2P, VD2N, . . . VDmP and/or VDmN. In embodiments, first to m-th data amplifiers TIA D1 to TIA Dm may transmit data voltages VD1P, VD1N, VD2P, VD2N, . . . VDmP and/or VDmN to a comparator (CO). In embodiments, first clock amplifier TIA C1 and/or second clock amplifier TIA C2 may convert first data currents D1P and D1N and/or second data currents D2P and D2N into clock voltages CLKP and CLKN, respectively, and may transmit clock voltages CLKP and/or CLKN to a comparator (CO).

According to embodiments, first data currents D1P and D1N and/or second data currents D2P and D2N, which may be applied to first clock amplifier TIA C1 and/or second clock amplifier TIA C2, respectively, and which may be converted into clock voltages to recover clock voltages, may also be used to recover data voltages. In embodiments, current levels of first data currents D1P and D1N and second data currents D2P and D2N may be twice the current levels of remaining data currents D3P, D3N, D4P, D4N, . . . DmP and/or DmN used for recovery of data voltages. In embodiments, first clock amplifier TIA C1 and/or second clock amplifier TIA C2 may use data currents D3P, D3N, D4P, D4N, . . . DmP and/or DmN other than first data currents D1P and D1N and/or second data currents D2P and D2N. In embodiments, the levels of the data currents used in clock amplifiers may be twice the levels of remaining data currents. In embodiments, data currents used to generate clock voltages may not be limited to first data currents D1P and D1N and/or second data currents D2P and D2N.

According to embodiments, a comparator (CO) may be electrically coupled to a trans-impedance amplifier TIA. In embodiments, a comparator (CO) may receive data voltages VD1P, VD1N, VD2P, VD2N, . . . , VDmP and/or VDmN, and/or clock voltages CLKP and CLKN, which may be output from a trans-impedance amplifier (TIA). In embodiments, a comparator (CO) may change voltage levels of received voltages, and/or may output resultant voltages as data signals Data[1], Data[2], . . . and/or Data[m] and/or a clock signal CLK IN, which may have voltage levels to drive liquid crystals of LCD panel 140.

According to embodiments, a comparator (CO) may include first to m-th data comparators CO D1 to CO Dm, and/or a clock comparator CO C. In embodiments, first to m-th data comparators CO D1 to CO Dm may be electrically coupled to first to m-th data amplifiers TIA D1 to TIA Dm, respectively. In embodiments, first to m-th data comparators CO D1 to CO Dm may receive first data voltages VD1P and VD1N to m-th data voltages VDmP and VDmN, and may output first to m-th data signals Data[1] to Data[m], respectively. In embodiments, LCD panel 140 may operate respective pixel circuits corresponding to first to m-th data signals Data[1] to Data[m].

According to embodiments, clock comparator CO C may be electrically coupled to first and/or second clock amplifiers TIA C1 and TIA C2. In embodiments, clock comparator CO C may receive clock voltages CLKP and CLKN from first and/or second clock amplifiers TIA C1 and TIA C2. In embodiments, clock comparator CO C may convert clock voltages CLKP and CLKN into a voltage having a voltage level corresponding to that of a clock signal CLK IN to be applied to each driver and LCD panel 140. In embodiments, clock comparator CO C may output resultant voltage as clock signal CLK IN. In embodiments, one data signal may be recovered through one data amplifier and one comparator, and/or one clock signal may be recovered through two clock amplifiers and one comparator.

According to embodiments, each of the data currents D1P, D1N, D2P, D2N, . . . DmP and/or DmN may be one bit DP or DN, and may have a relatively high level for example in D1P, D2P, . . . and/or DmP, or a relatively low level for example in D1N, D2N, . . . and/or DmN. In embodiments, first data currents D1P and MN may have a relatively high level for example in D1P and a relatively low level for example in D1N. In embodiments, through a comparison between current levels, a relatively higher one of the current levels may be determined as high level DIP, and a relatively lower one of the current levels may be determined as low level D1N.

According to embodiments, a delay locked loop (DLL) may be electrically coupled to a comparator (CO). In embodiments, a delay locked loop (DLL) may generate a clock CLK OUT having a plurality of pulses, using a clock signal CLK IN output from a comparator (CO). In embodiments, a delay locked loop (DLL) may output a clock CLK OUT, which may have a plurality of pulses, to generate a clock signal to be applied between successive data signals.

According to embodiments, source driver 120 may include a voltage supplier to supply a drive voltage to each driver and/or the LCD panel 140. In embodiments, source driver 120 may include a low drop out (LDO) unit to change the level of the voltage supplied from a voltage supplier into a reference voltage level. However, embodiments are not limited to these elements.

Embodiments relate to driving timing of a source driver. Referring to example FIG. 3A to 3C, diagrams of driving timing of a source driver is illustrated in accordance with embodiments. Referring to FIG. 3A, a timing diagram of first data currents D1P and MN and second data currents D2P and D2N applied to source driver 120 is illustrated in accordance with embodiments. Referring to FIG. 3B, a timing diagram of clock signals CLKP and CLKN output from a trans-impedance amplifier TIA is illustrated in accordance with embodiments. Referring to FIG. 3C, a timing diagram of first data signals VD1P and VD1N and second data signals VD2P and VD2N output from a trans-impedance amplifier TIA is illustrated in accordance with embodiments.

According to embodiments, a driving period of source driver 120 may include a data driving period TD and/or a clock driving period TC. In embodiments, each of first data currents D1P and D1N and/or second data currents D2P and D2N may have a first current level 2I, a second current level 4I, a third current level 5I and/or a fourth current level I. In embodiments, second current level 4I may be a current level higher than first current level 2I. In embodiments, third current level 5I may be a current level higher than second current level 4I. In embodiments, fourth current level I may be a current level lower than first current level 2I.

According to embodiments, when each of first data currents D1P and D1N and/or second data currents D2P and D2N have first current level 2I and second current level 4I, a data voltage may be recovered therefrom. In embodiments, when each of first data currents D1P and D1N and/or second data currents D2P and D2N have third current level 5I and fourth current level I, a clock voltage may be recovered therefrom. In embodiments, third data currents D3P and D3N to m-th data currents DmP and DmN, which may be used for recovery of data voltages, may be recovered into data voltages when they have fourth current level I and first current level 2I. In embodiments, current levels 2I and 4I of first data currents D1P and D1N and/or second data current D2P and D2N may be twice as high as current levels I and 2I of the third data currents D3P and D3N to the m-th data currents DmP and DmN, which may be used to recover data voltages.

According to embodiments, conversion of first data currents D1P and D1N and/or second data current D2P and D2N into first data voltages VD1P and VD1N, second data voltages VD2P and VD2N, first clock voltage CLKP and/or second clock voltage CLKN may be accomplished. In embodiments, when internal resistance of first data amplifier TIA D1 and second data amplifier TIA D2 is R, the internal resistance of the first clock amplifier TIA C1 may be set to R/3 and/or the internal resistance of the second clock amplifier TIA C2 may be set to 2R/3. In embodiments, internal resistances may determine the levels of voltages output from a trans-impedance amplifier (TIA). In embodiments, internal resistances may be set to have other values in accordance with levels of voltages to be output.

According to embodiments, a trans-impedance amplifier (TIA) may receive data currents, convert data currents into data voltages, and/or output data voltages in a data driving period TD. In embodiments, each of first data currents D1P and MN and/or second data currents D2P and D2N may have first current level 2I and second current level 4I. In embodiments, first data currents D1P and D1N may be applied to both first data amplifier TIA D1 and first clock amplifier TIA C1. In embodiments, currents having respective levels corresponding to ½ of the current levels of first data currents D1P and D1N may be applied to each of first data amplifier TIA D1 and first clock amplifier TIA C1. In embodiments, currents applied to first data amplifier TIA D1 may have fourth current level I and first current level 2I, and currents applied to the first clock amplifier TIA C1 may also have fourth current level I and first current level 2I. In embodiments, a current having fifth current level 3I, which may corresponds to a sum of fourth current level I and first current level 2I, may be applied to first clock amplifier TIA C1.

According to embodiments, when first data amplifier TIA D1 receives a current having fourth current level I, each of first data voltages VD1P and VD1N output from first data amplifier TIA D1 may be converted into a first voltage VDD-IR because internal resistance of the first data amplifier TIA D1 may be R. In embodiments, when first data amplifier TIA D1 receives a current having first current level 2I, each of first data voltages VD1P and VD1N may be converted into a second voltage VDD-2IR. In embodiments, when first clock amplifier TIA C1 receives a current having the fifth current level 3I, first clock voltage CLKP output from first clock amplifier TIA C1 may be converted into first voltage VDD-IR because internal resistance of first clock amplifier TIA C1 may be R/3.

According to embodiments, second data currents D2P and D2N may be applied to both second data amplifier TIA D2 and second clock amplifier TIA C2. In embodiments, currents having respective levels corresponding to ½ of the current levels of second data currents D2P and D2N may be applied to each of second data amplifier TIA D2 and second clock amplifier TIA C2. In embodiments, currents applied to second data amplifier TIA D2 may have fourth current level I and first current level 2I, and currents applied to second clock amplifier TIA C2 may also have fourth current level I and first current level 2I. In embodiments, a current having fifth current level 3I, which may correspond to a sum of fourth current level I and first current level 2I, may be applied to second clock amplifier TIA C2.

According to embodiments, when second data amplifier TIA D2 receives a current having fourth current level I, each of second data voltages VD2P and VD2N output from second data amplifier TIA D2 may be converted into first voltage VDD-IR because internal resistance of second data amplifier TIA D2 may be R. In embodiments, when second data amplifier TIA D2 receives a current having first current level 2I, each of second data voltages VD2P and VD2N may be converted into second voltage VDD-2IR. In embodiments, when second clock amplifier TIA C2 receives a current having fifth current level 3I, second clock voltage CLKN output from second clock amplifier TIA C2 may be converted into second voltage VDD-2IR because internal resistance of second clock amplifier TIA C2 may be 2R/3.

According to embodiments, in clock driving period TC, a trans-impedance amplifier (TIA) may receive data currents, convert data currents into data voltages, and/or output data voltages. In embodiments, first data currents D1P and D1N may have third current level 5I, and second data currents D2P and D2N may have fourth current level I. In embodiments, when first clock amplifier TIA C1 receives a current having third current level 5I, first clock voltage CLKP output from first clock amplifier TIA C1 may be converted into third voltage VDD-5IR/3 because internal resistance of the first clock amplifier TIA C1 may be R/3.

According to embodiments, first clock voltage CLKP may be recovered into a clock voltage variable in level such that it may have a level corresponding to first voltage VDD-IR in data driving period TD while having a level corresponding to third voltage VDD-5IR/3 in clock driving period TC. In embodiments, when second clock amplifier TIA C2 receives a current having fourth current level I, second clock voltage CLKN output from second clock amplifier TIA C2 may be converted into fourth voltage VDD-2IR/3 because internal resistance of second clock amplifier TIA C2 may be 2R/3. In embodiments, second clock voltage CLKN may be recovered into a clock voltage variable in level such that it may have a level corresponding to second voltage VDD-2IR in data driving period TD while having a level corresponding to the fourth voltage VDD-2IR/3 in clock driving period TC.

According to embodiments, source driver 120 may not use a separate reference voltage upon separating a clock from data. In embodiments, it may be possible to recover a clock signal and a data signal, irrespective of a variation in current occurring due to a variation in reference voltage and/or when a current is applied from the timing controller. In embodiments, source driver 120 may carry a clock signal in a data current under a condition in which the clock signal may have a different current level from a data current. In embodiments, it may be possible to relatively reduce a number of signal lines, and/or relatively reduce manufacturing costs. In embodiments, source driver 120 may be used in a panel operating at maximized speed.

According to embodiments, source driver 120 may achieve conversion of a data current into a data voltage and a clock voltage, using a trans-impedance amplifier (TIA). In embodiments, it may be possible to substantially eliminate IR-drop occurring in a structure using a termination resistor. In embodiments, it may be possible to relatively easily achieve signal recovery, for example using a small current. In embodiments, since source driver 120 may achieve signal recovery, using for example a micro current, it may be possible to use a chip-on-glass (COG) structure exhibiting a maximized signal resistance. In embodiments, the area of a flexible PCB used in a COG structure may be minimized. In embodiments, compactness may be achieved.

According to embodiments, in a source driver and a LCD device having the same in accordance with embodiments, it may be possible to carry a clock in a data current, and to recover a clock signal and a data signal, using current levels, without being substantially affected by a termination resistance and/or external frequencies. In embodiments, errors generated during a signal recovery operation may be minimized. In embodiments, in a source driver and a LCD device having the same in accordance with embodiments, it may be possible to transmit a data current and a clock under a condition in which a clock is carried in a data current, and/or to recover a data signal and a clock signal through a trans-impedance amplifier (TIA). In embodiments, IR-drop may be minimized. In embodiments, errors occurring during a signal recovery operation may be minimized. In embodiments, signal recovery, using a small current, may be achieved.

It will be obvious and apparent to those skilled in the art that various modifications and variations can be made in the embodiments disclosed. Thus, it is intended that the disclosed embodiments cover the obvious and apparent modifications and variations, provided that they are within the scope of the appended claims and their equivalents.

What is claimed is:

1. An apparatus comprising:

a trans-impedance amplifier configured to receive data currents, convert said data currents into voltages, and output said voltages as data voltages and clock voltages; and a comparator electrically coupled to said trans-impedance amplifier configured to change levels of said data and clock voltages applied from said trans-impedance amplifier and to output said level-changed voltages as data signals and a clock signal, wherein said trans-impedance amplifier comprises:

a first data amplifier configured to receive a first data current and convert said first data current into a voltage to output a first data voltage;

a second data amplifier configured to receive a second data current and convert said second data current into a voltage to output a second data voltage; and a clock amplifier configured to receive said first and second data currents and to convert said first and second data currents into a voltage to output a clock voltage.

2. The apparatus of claim 1, wherein the comparator comprises:

a first data comparator configured to change a level of said first data voltage applied from said first data amplifier to output a first data signal;

a second data comparator configured to change a level of said second data voltage applied from said second data amplifier to output a second data signal; and a clock amplifier configured to change a level of said clock voltage applied from said clock amplifier to output said clock signal.

3. The apparatus of claim 1, wherein each of said first and second data currents applied to said trans-impedance amplifier comprises:

first and second current levels to output said first and second data voltages; and third and fourth current levels to output said clock voltage.

4. The apparatus of claim 3, wherein said second current level is higher than said first current level, said third current level is higher than said second current level, and said fourth current level is lower than said first current level.

5. The apparatus of claim 4, comprising:

third to m-th data amplifiers configured to receive third to m-th data currents and convert said third to m-th data currents into voltages to output third to m-th data voltages; and third to m-th data comparators configured to change levels of said third to m-th data voltages applied from said third to m-th data amplifiers to output third to m-th data signals.

6. The apparatus of claim 5, wherein each of said third to m-th data currents comprises said fourth current level and said first current level.

7. The apparatus of claim 1, comprising:

a delay locked loop electrically coupled to the comparator configured to generate a clock having a plurality of pulses when said clock signal is applied.

8. A method comprising:

providing a trans-impedance amplifier to receive data currents, convert said data currents into voltages, and output said voltages as data voltages and clock voltages; and providing a comparator electrically coupled to said trans-impedance amplifier to change levels of said data and clock voltages applied from said trans-impedance amplifier and to output said level-changed voltages as data signals and a clock signal, wherein:

said trans-impedance amplifier comprises a first data amplifier to receive a first data current and convert said first data current into a voltage to output a first data voltage, a second data amplifier to receive a second data current and convert said second data current into a voltage to output a second data voltage, and a clock amplifier to receive said first and second data currents and to convert said first and second data currents into a voltage to output a clock voltage; and the comparator comprises a first data comparator to change a level of said first data voltage applied from said first data amplifier to output a first data signal, a second data comparator to change a level of said second data voltage applied from said second data amplifier to output a second data signal, and a clock amplifier to change a level of said clock voltage applied from said clock amplifier to output said clock signal.

9. The method of claim 8, comprising at least one of:

a delay locked loop electrically coupled to the comparator to generate a clock having a plurality of pulses when said clock signal is applied; and a timing controller electrically coupled to said source driver to transmit said data currents to said source driver, a gate driver to output gate signals, and a liquid crystal display panel electrically coupled to said gate driver and said source driver to receive said gate signals, data signals, and said clock signal, and to determine an alignment of liquid crystals in accordance with said received signals to display an image.

* * * * *